(12) United States Patent
Marmaros et al.

(10) Patent No.: US 7,707,573 B1
(45) Date of Patent: Apr. 27, 2010

(54) SYSTEMS AND METHODS FOR PROVIDING AND INSTALLING SOFTWARE

(75) Inventors: David Marmaros, Mountain View, CA (US); Stephen R. Lawrence, Mountain View, CA (US); Mihai Florin Ionescu, Mountain View, CA (US); Niniane Wang, Santa Clara, CA (US); Omar Habib Khan, Toronto (CA)

(73) Assignee: Google Inc., Mountain View, CA (US)

( * ) Notice: Subject to any disclaimer, the term of this patent is extended or adjusted under 35 U.S.C. 154(b) by 1157 days.

(21) Appl. No.: 10/749,439

(22) Filed: Dec. 31, 2003

(51) Int. Cl.
*G06F 9/445* (2006.01)
*G06F 15/173* (2006.01)

(52) U.S. Cl. .................... 717/178; 717/121; 717/171; 709/224

(58) Field of Classification Search .................. 717/170
See application file for complete search history.

(56) References Cited

U.S. PATENT DOCUMENTS

| | | | |
|---|---|---|---|
| 5,909,544 A | 6/1999 | Anderson et al. | |
| 6,006,222 A | 12/1999 | Culliss | |
| 6,014,665 A | 1/2000 | Culliss | |
| 6,078,916 A | 6/2000 | Culliss | |
| 6,182,068 B1 | 1/2001 | Culliss | |
| 6,199,204 B1* | 3/2001 | Donohue | 717/178 |
| 6,493,871 B1* | 12/2002 | McGuire et al. | 717/173 |
| 6,499,027 B1 | 12/2002 | Weinberger | |
| 6,560,614 B1 | 5/2003 | Barboy et al. | |
| 6,581,056 B1 | 6/2003 | Rao | |
| 6,970,698 B2* | 11/2005 | Majmundar et al. | 455/419 |
| 6,971,094 B1* | 11/2005 | Ly | 717/172 |
| 6,990,660 B2* | 1/2006 | Moshir et al. | 717/171 |
| 2001/0054026 A1* | 12/2001 | Choate | 705/52 |
| 2002/0143952 A1* | 10/2002 | Sugiarto et al. | 709/227 |
| 2002/0152305 A1 | 10/2002 | Jackson et al. | |
| 2002/0166117 A1* | 11/2002 | Abrams et al. | 717/177 |
| 2003/0167266 A1 | 9/2003 | Saldanha et al. | |
| 2004/0098361 A1* | 5/2004 | Peng | 707/1 |
| 2004/0143569 A1 | 7/2004 | Gross et al. | |

(Continued)

OTHER PUBLICATIONS

"On the impact of concurrent downloads", Liu et al., Dec. 2001, pp. 1300-1305. Online retrieved at <http://delivery.acm.org/10.1145/570000/564314/p1300-liu.pdf>.*

(Continued)

*Primary Examiner*—Tuan Q Dam
*Assistant Examiner*—Thuy Dao
(74) *Attorney, Agent, or Firm*—Fenwick & West LLP (57) ABSTRACT

The present invention comprises systems and methods, and computer readable media comprising the methods, for installing software components. A user's need for a software component may be determined prior to installation. The systems and methods of the present invention provide automation and flexibility to the installation process. In an embodiment, processor usage and network usage are monitored and software installation are initiated and/or continued during periods where processor and/or network usage are low. The installation process may be halted when the processor and/or network connection are called upon for other uses. Processor and/or network usage may also be throttled, for example limiting the bandwidth available for the installation to maintain sufficient processor share and/or bandwidth for other tasks. Adverse impact on a computer user is minimized.

25 Claims, 4 Drawing Sheets

U.S. PATENT DOCUMENTS

2004/0261081 A1  12/2004  Sen
2005/0149932 A1  7/2005  Hasink et al.

OTHER PUBLICATIONS

"An optimal service ordering for a world wide web server", Dalal et al., Sep. 2001, pp. 8-13. Online retrieved at <http://delivery.acm.org/10.1145/580000/572319/p8-dalal.pdf>.*

"A transport layer approach for achieving aggregate bandwidths on multi-homed mobile hosts", Hsieh et al., Sep. 2002, pp. 83-94. Online retrieved at <http://delivery.acm.org/10.1145/580000/570656/p83-hsieh.pdf>.*

"Characterizing mobility and network usage in a corporate wireless local-area network", Balazinska et al., May 2003, pp. 303-316. Online retrieved at <http://delivery.acm.org/10.1145/1070000/1066127/p303-balazinska.pdf>.*

U.S. Appl. No. 10/749,440, filed Dec. 31, 2003, Badros et al.

80-20 Software—Products—80-20 One Search, http://www.80-20.com/products/one-search/retriever.asp. printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines." School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin, S., et al, "The Anatomy of a Large-Scale Hypertextual Web Search Engine," http://www7.scu.edu.au/programme/fullpapers/1921/com1921.htm, pp. 1-18, 1998.

Budzik, J., at al., User Interactions with Everyday Applications as Context for Just-in-time Information Access, Intelligent Information Laboratory, Northwestern University, pp. 1-8, no date.

Devonthink, http://www.devon-techonologies.com/products/devonthink.php, printed Mar. 16, 2004.

dtSearch®—http://www.dtsearch.com/, printed Mar. 15, 2004.

Dumais, S., et al, "Stuff I've Seen: A System for Personal Information Retrieval and Re-Use," Microsoft Research, *SIGIR'03*, Jul. 28-Aug. 1, 2003, pp. 1-8.

Enfish, http://www.enfish.com, printed Mar. 16, 2004.

Fast Search & Transfer—Home—Enterprise Search. http://solutions.altavista.com/en/news/pr_020402_desktop.shtmu, printed Mar. 16, 2004.

Fertig. S., et al., "Lifestreams: An Alternative to the Desktop Metaphor," http://www.acm.org/sigchi/chi96/proceedings/videos/Fertig/elf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop. http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e.... pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4, 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '96). pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm...., pp. 1-5, printed Apr. 21, 2004.

"Searching for the next Google—New trends are helping nimble startups elbow in to the plundered market," Red Herring—The Business of Technology, Mar. 9. 2004, http://redherring.com/PrintArlicle.aspx?a=4782&sector=Capital, p. 1-5, printed Mar. 30, 2004.

"Selecting Task-Relevant Sources for Just-In-Time Retrieval," pp. 1-3, no. date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998. pp. 1-2.

WebWatcher Home Page, "Welcome to the WebWatcher Project," http://www-2.cs.cmu.edu/~webwatcher/, printed Oct.15, 2003.

"WhenU Just-In-Time Marketing," http://www.whenu.com, printed Mar. 19, 2004.

X1 instantly searches files & email. For outlook, Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

Silberschatz, A., et al., "Operating System Concepts," Sixth Edition, Mar. 8, 2002, pp. 27-52, 151-185 and 491-528, John Wiley & Sons, Inc., New Jersey.

"Alexa Web Search—Toolbar Quick Tour," Alexa Internet, Inc., 1996-2006, [online] [Retrieved on Oct. 29, 2006] Retrieved from the Internet<URL:http://pages.alexa.com/prod_serv/quicktour_new.html>.

Archive of "Remem: The Remembrance Agent," Bradley Rhodes, Feb. 16, 2004, www.remem.org, [online] [Archived by http://archive.org on Aug. 2, 2003; Retrieved on Oct. 20, 2006] Retrieved from the Internet<URL:http://web.archive.org/web/20030802195037/www.remem.org/>.

* cited by examiner

SYSTEMS AND METHODS FOR PROVIDING AND INSTALLING SOFTWARE

FIELD OF THE INVENTION

The present invention relates to computer systems and computer software including server and client systems on a network and in particular to systems, methods and computer readable media for installing software provided by one computing device on another computing device.

BACKGROUND

A typical software product, such as a database, word processor, spreadsheet, utility may be organized into a group or "suite" of individual component programs, or "components." A suite may include several distinct software products, each having its own components and possibly sharing one or more components with other products in the suite.

Many of the components of a software suite may not be required for use of other components or the suite as a whole, but may, instead, be included as enhancements or options. A user of the software, and/or the developer of the software, may desire that some of the components be installed when the software suite is being used for certain tasks. For example, if the software suite is installed on a computer system that is a part of a multi-location network, a user or the suite developer may desire that more networking components be installed than in a stand-alone scenario. As another example, a user that frequently uses a certain file type, for example a "pdf" file, may desire that the software function with pdf files whereas a user that infrequently uses pdf files may not deem such functionality important.

Some components may be desirable regardless of the scenario in which the suite is being used. For example, the suite developer may periodically introduce updates and patches to various components in the form of so-called "service packs" and "hot fixes." It may be desirable to make service packs and hot fixes mandatory components that get installed regardless of the scenario for which the suite is being used.

Computer networks provide a channel for software installation.

In one current method for installing software a small installer application is transferred from one computing device to a second computing device, for example from a server to a client computer. Execution of the installer application begins the installation process and the installer application obtains/transfers the remainder of application suite from the first computing device and installs suite components on the second computing device. During download and installation the computing device(s) may be "locked" from performing other tasks and a substantial portion or all of the available network bandwidth may be devoted to the file transfer. Further, applications already running on the computing device may need to be closed and/or the computing device rebooted (shut down and re-started).

In another current method of installing software an entire application suite, in compressed or uncompressed form, is transferred from one computing device to a second computing device, for example in the form of a disk image. An installer application transferred with the suite proceeds to install suite components. Again, during download and installation the computing device(s) may be "locked" from performing other tasks and a substantial portion or all of the available network bandwidth may be devoted to the file transfer. Also, applications running on the computing device may need to be closed and/or the computing device rebooted.

As will be appreciated, both of the foregoing described methods for installing software create inefficiencies in computer processor usage, network usage, file access and/or computer memory space. Further, the installation of complete software application suites by the foregoing methods may result in installation of software components that a user does not desire and that may create incompatibilities with other software desirable to the user. The unused components may also use valuable storage space and/or memory on the computer.

Accordingly, it would be desirable to have new and improved methods for installing software.

SUMMARY OF THE INVENTION

The present invention comprises systems, methods and computer readable media for installing software. In an embodiment, a need for a software component is determined and a determination is made as to whether to initiate installation of the component. In an embodiment, the determination of whether to initiate installation may be made by monitoring usage of the computing device, for example by monitoring user activity, processor usage, memory usage; disk usage and/or network usage. Software installation may be initiated and/or continued during periods where usage of the computing device or its components are below a predetermined threshold level. In one embodiment processor, disk and/or network usage are monitored and installation initiated or continued when the level of one or more is below a certain threshold level. The installation process may be halted when the processor, disk and/or network connection are called upon for other uses. In an embodiment, processor, disk and/or network usage may be throttled, for example limiting the bandwidth available for the installation, to maintain sufficient processor share and/or bandwidth for other tasks.

Details of exemplary embodiments of the present invention, including their features and advantages, are set forth below.

BRIEF DESCRIPTION OF THE FIGURES

Features, aspects, and advantages of the present invention are better understood when the following Detailed Description is read with reference to the accompanying drawings, wherein.

DETAILED DESCRIPTION

The present invention provides systems and methods for installing software applications. In embodiments, the systems and methods allow installation of software applications onto computers residing on a local area or wide area network such as the Internet/World Wide Web. In other embodiments, the systems and methods of the present invention allow for the efficient installation of software from files residing on a computing device.

A software application or suite may comprise a plurality of software components. A user of a computing device may desire to use a subset of the plurality of software components.

In an embodiment, a method of the present invention determines a component from a plurality of software components for installation onto a computing device. The decision to install a particular component may be based on one or more of the following factors: a user request for the component; a request from another component of the software application for installation of the component; a request from another application for installation of the component; a determination based on a user's computing patterns; and/or a determination based on use of the computing device. In an embodiment of the present invention, the installation process, including initiation of installation; proceeding with installation; and/or completing installation includes monitoring of usage of the computing device(s)' processor(s) and/or monitoring of a network connection between and/or among computing devices; and initiating or continuing installation of the software component during a time period based on the level of processor activity, for example, when the processor is otherwise substantially inactive and/or the network connection is substantially inactive.

For purposes of describing embodiments of the present invention wherein computing devices are networked, the terminology "donor computing device" refers to a computing device having software files for installation and the terminology "recipient computing device" refers to a computing device receiving software files for installation.

In an embodiment, software files for installation may be provided from a software vendor's/publisher's donor computing device, for example a server, to a recipient computing device using an Internet-capable communications protocol. Generally, the recipient computing device will access the Internet through a dial-up or broadband connection. Typical broadband connections include T1 connections, Cable connections or DSL connections. The recipient computing device may reside on a network and access the Internet through a single network connection. In this environment, bandwidth limitations will likely exist among the individual computers on the network and between the network and the Internet.

In another embodiment, software files for installation may be provided from a donor computing device on a network, such as a local area network, to a recipient computing device on the network using a network communications protocol. In this environment, bandwidth limitations will likely exist among the individual computers on the network.

In another embodiment, software files for installation may reside on an individual computing device, in memory, or on accessible storage media. The files may be installed from the computing device memory or storage media using an embodiment of a method of the present invention.

In one embodiment a method of the present invention for installing a software component on a computing device comprises monitoring usage of the computing device; determining a need for a software component; and initiating installation of the software component during a time period based on usage of the computing device. In an embodiment, the monitoring usage of the computing device may comprise one or more of the following: monitoring usage of a processor; monitoring usage of a storage medium, for example a disk; monitoring usage of memory; monitoring user activity and/or monitoring usage of a network activity. In one embodiment, the determining the need for a software component may comprise one or more of the following: recognizing when a user accesses a particular application or encounters a particular file type; and/or installing a software stub component that periodically checks if the full software component would be beneficial to the user.

The level of processor activity that may be used as the basis for initiating or continuing an installation in one embodiment of the present invention may be determined based on consideration of one or more of the following criteria: the processor is substantially inactive; sufficient processor resources are available despite other tasks being performed by the processor; sufficient processor resources are available in between other tasks being performed by the processor; and similar criteria.

The level of storage medium activity that may be used as a basis for initiating or continuing an installation in one embodiment of the present invention may be determined based on consideration of one or more of the following criteria: disk activity is substantially inactive; disk access is available for the installation despite other computing device activity; sufficient disk access is available in between other activity; and similar criteria.

The level of memory activity that may be used as the basis for initiating or continuing an installation in one embodiment of the present invention may be determined based on consideration of one or more of the following criteria: requests to the memory are substantially inactive; sufficient memory resources are available despite other tasks being performed by the computing device; sufficient memory resources are available in between other tasks being performed by the computing device; and similar criteria.

The level of network activity that may be used as a basis for initiating or continuing an installation in one embodiment of the present invention may be determined based on consideration of one or more of the following criteria: network activity is substantially inactive; sufficient network bandwidth is available for the installation despite other network activity; sufficient network bandwidth is available in between other network activity; and similar criteria.

The level of user activity that may be used as the basis for initiating or continuing an installation in one embodiment of the present invention may be determined based on consideration of one or more of the following criteria: user activity is substantially inactive; user activity will not be impaired by update activity; and similar criteria.

In another embodiment, a method of the present invention for installing a software component on a computing device including a processor comprises: monitoring usage of the processor; determining a need for a software component; and initiating or continuing an installation of the software component based on the level of processor activity.

In another embodiment, a method of the present invention for installing a software component on a recipient computing device including a processor and a network connection comprises: monitoring usage of the processor; determining a need for a software component; and initiating or continuing an installation of the software component during a time period when the processor is otherwise substantially inactive. The method may further comprise monitoring usage of the network connection and initiating or continuing an installation of the software component during a time period based on the level of network activity.

In a further embodiment, a method of the present invention for installing a software component on a recipient computing device including a processor and a network connection comprises: monitoring usage of the network connection; determining a need for a software component; and initiating or continuing installation of the software component during a time period based on the level of network activity. The method may further comprise monitoring usage of the processor and initiating or continuing an installation of the software component during a time period based on the level of processor activity. In an additional embodiment, a method of the present invention for installing a software application on a computer including a processor and a network connection comprises: monitoring usage of the network connection; determining a need for a software component; and initiating or continuing installation of the software component during a time period when the network connection is being used to download other data. The method may further comprise monitoring usage of the processor and initiating or continuing an installation of the software component during a time period based on the level of processor activity.

The initiating of an installation may comprise the transfer and execution of an installation file from memory of the computing device, or computer readable media accessible to the computing device. In an embodiment of the present invention wherein a donor computing device and the recipient computing device are networked, the initiating of installation may comprise transfer of an executable installation file from the donor computing device to the recipient computing device. In an embodiment, the donor computing device comprises a network server. In a further embodiment the donor computing device comprises a network server maintained by the publisher of the software application being installed.

The continuing an installation step in any of the foregoing methods may comprise continuing the transfer of the software component; at least partially installing the software component on the recipient computer; completing the installation of the software component on the recipient computer or combinations of the foregoing.

Embodiments may further comprise throttling the transfer rate and/or the installation rate to limit the bandwidth and/or portion of the processor used for the installation.

In some embodiments the throttling of the transfer rate further comprises the recipient computing device calculating and sending a maximum transfer rate to the donor computing device, the donor computing device sending data no faster than the specified rate. The recipient computing device may update the maximum transfer rate throughout the transfer. This embodiment allows accurate throttling of bandwidth usage without modifying low-level network implementations on the client device.

In an embodiment, the initial installation proceeds in the foreground similar to the regular downloading of a file in Microsoft Windows, with an additional option that allows the user to switch to background mode as per other embodiments, and notify the user when the installation is complete.

In embodiments where the recipient computing device resides on a local or wide area network, monitoring usage of the network connection may comprise monitoring usage of the connection between the recipient computing device and the local or wide area network server; monitoring usage of the network connection between the local or wide area network server and the Internet; and/or monitoring usage of the network connection among and between the computing devices on the network.

In embodiments where the recipient computing device is sometimes located on a low-bandwidth connection such as a dial-up modem connection or low-speed wireless connection, and sometimes located on a broadband connection such a LAN or cable modem, monitoring usage of the network connection may comprise monitoring when the recipient computing device is connected to each kind of connection and preferably performing installation when the recipient device is connected to a high-speed connection. If initiated on a high-speed connection and the recipient device switches to a low-speed connection, the installation may be suspended until the device is connected to the high-speed connection again, unless a maximum waiting period expires after which installation continues with the low-speed connection.

In an embodiment of the present invention determining the need for a software component comprises: selecting of the software component by a user of a computing device. In an embodiment, an installation program comprises a menu that allows a computer user to select software components for installation. Installation of the software components is made in accordance with an embodiment of the present invention.

In another embodiment of the present invention the determination of the need for a software component comprises: selecting of the software component by a publisher of a software application comprising the software component. By way of example, a software publisher may desire to provide functionality by linking installation of various software components.

In a further embodiment determining the need for a software component comprises: selecting of the software component by another component in a software application comprising a plurality of components. As an example, execution of commands in one software component may be facilitated by access to another software component.

In a further embodiment determining the need for a software component comprises: selecting of the software component based on a monitoring of the usage patterns of a user of a computing device.

For example, if one component of an application provides support for handing PDF files, this component may be automatically installed if the user has or uses a PDF file on the recipient device. This may happen even if the user does not specifically request functionality provided by the component, i.e., an application may automatically determine based on usage patterns that a component would be beneficial to the user.

In one embodiment, small stub components corresponding to optional components of an application are installed whose function is to identify whether or not the full component is required or would be beneficial.

In an additional embodiment, determining the need for a software component comprises: selecting of the software component based on a survey of files on a computing device. The survey may comprise determining file types resident on a computing device and comparing the file types to a software component to determine whether the software component relates to use or access of the file types. By way of example, if a particular type of graphics file, for example a "jpg" file, is resident on the computing device and the software component relates to the use or access to jpg files, a determination may be made that the software component should be installed on the computer.

A system of the present invention comprises computer hardware and software for performing a method of the present invention. Computer readable media of the present invention comprises virtual or physical computer readable media described below containing program instructions for performing a method of the present invention.

Embodiments of the present invention are particularly advantageous for use as part of an overall system architecture such as the one described in commonly assigned, co-pending, U.S. patent application Ser. No. 10/750,128, filed Dec. 31, 2003, entitled "Methods and Systems for Regulating Resource Usage," the disclosure of which is hereby incorporated herein by reference.

Figure 1A:
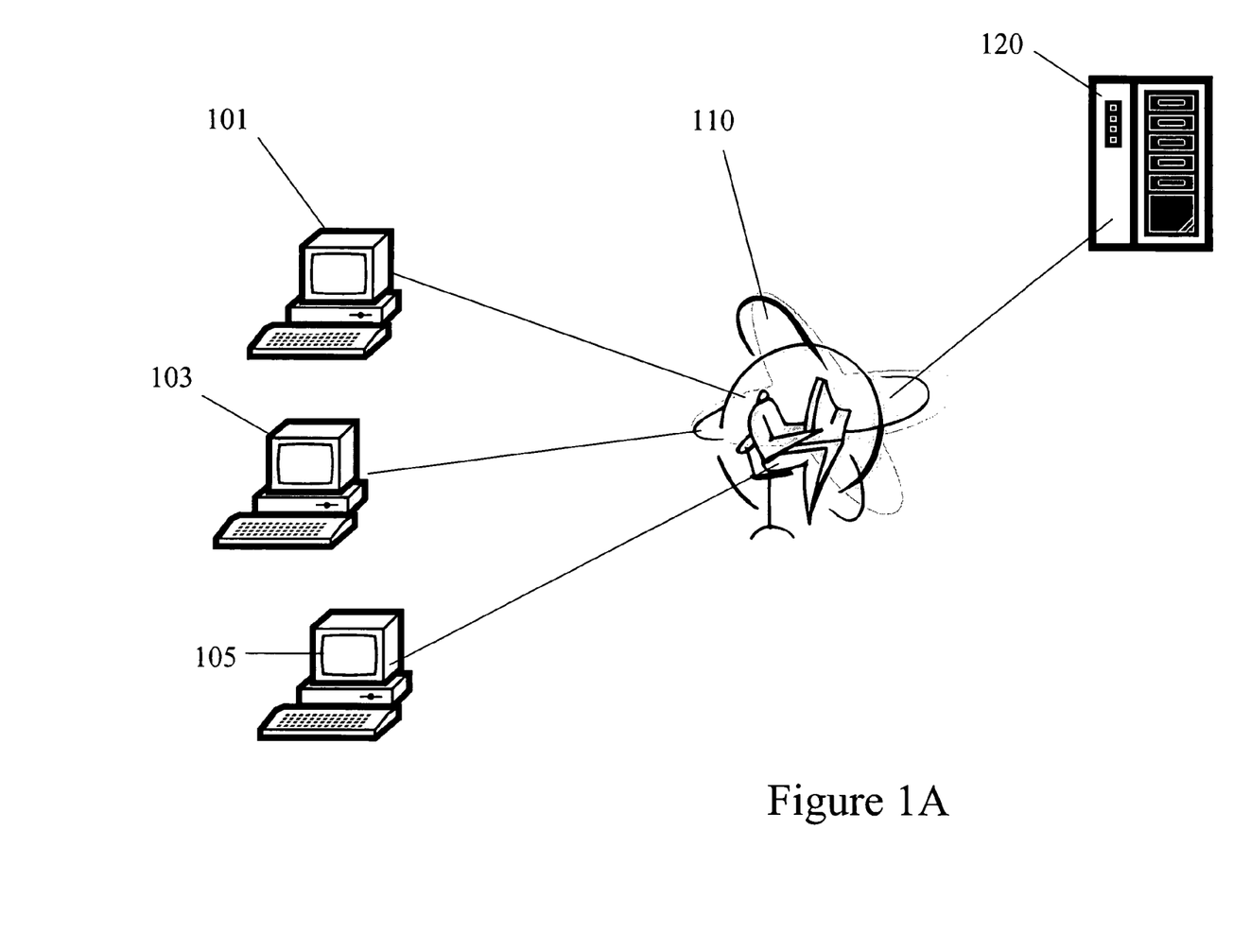
FIG. 1A is a schematic overview of servers and computers interconnected via the Internet/World Wide Web.

Referring now to the drawings in which like numerals indicate like elements throughout the several figures, and wherein in the description below "device" may be used to indicate "computing device", FIG. 1 is a block diagram illustrating an exemplary environment for implementation of an embodiment of the present invention. The environment shown reflects the World Wide Web. Individual client computing devices 101, 103 and 105, etc. are connected to the Internet 110. Each connection may independently comprise a dial-up connection, for example through a modem and a wired or wireless telephone link; a broadband connection, for example through a T-1 line, cable modem, ADSL line and modem; a wireless network connection, for example through an 802.11 protocol, Bluetooth or the like; or any other method of connecting to the Internet. The environment also includes a software publisher's server computing device 120 which is also connected to the Internet. The individual client computing devices may communicate with the software publisher's server computing device using telecommunications protocol via the Internet.

Figure 1B:
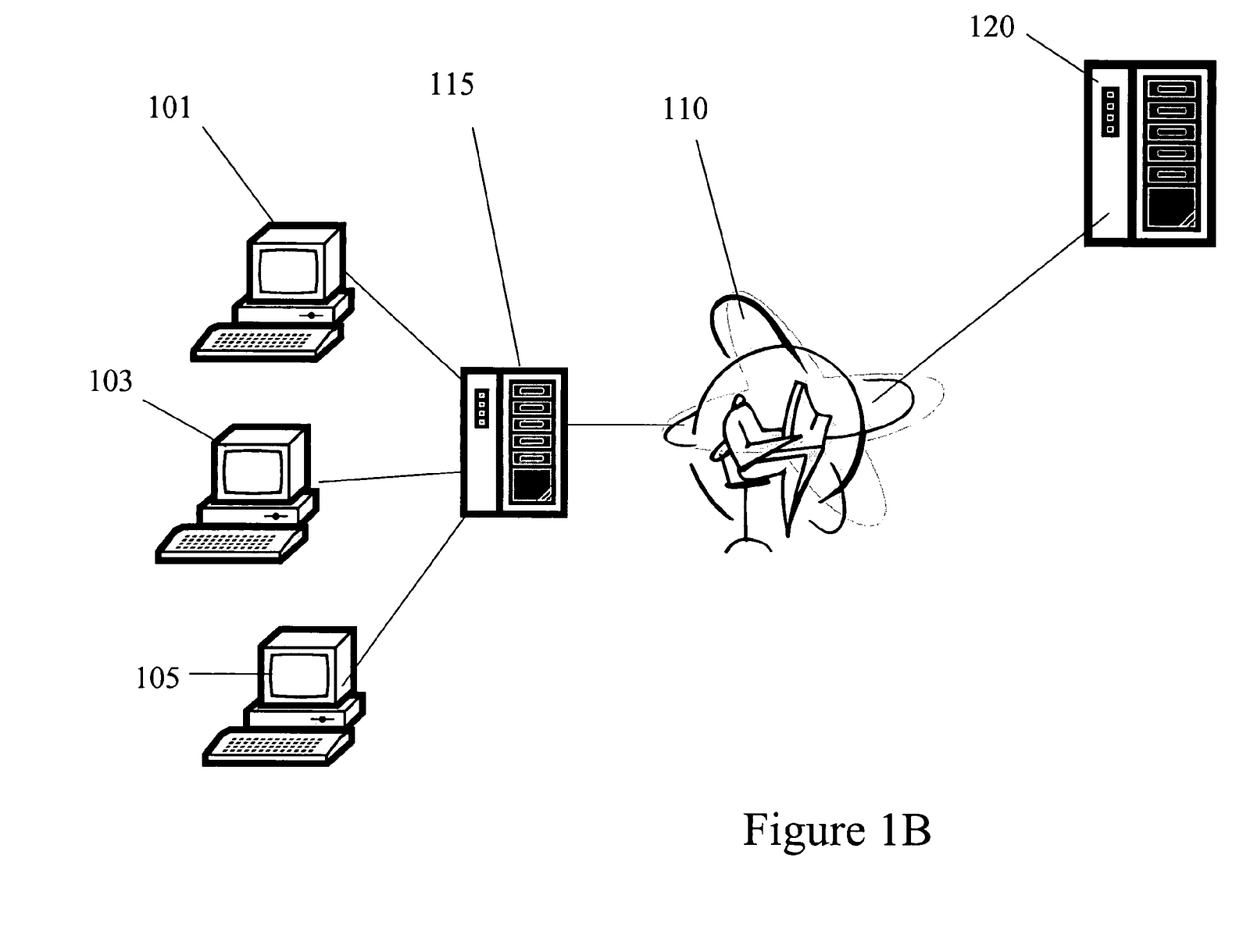
FIG. 1B is a schematic overview of a local/wide area connection to other servers via the Internet/World Wide Web.

FIG. 1B depicts an alternate environment. In the environment of FIG. 1B, computing devices 101, 103 and 105 are networked, for example in a local area network or wide area network through network server device 115. Network server device 115, communicates with the Internet, 110.

The server computing device 115 may include a processor coupled to a computer-readable memory and a communications device. Server computing device 115, depicted as a single computer system, may be implemented as a network of computer processors. Examples of a server computing device 115 are servers, mainframe computers, networked computers, a processor-based device, and similar types of systems and devices. The server processor can be any of a number of computer processors, such as processors from Intel Corporation of Santa Clara, Calif. and Motorola Corporation of Schaumburg, Ill.

The server computing device memory may include any of the processors described below with reference to computing devices, client devices and a method of the present invention.

It should be noted that the present invention may comprise systems having different architecture than that which is shown in FIGS. 1A and 1B. For example, in some systems according to the present invention, server device may comprise a single physical or logical server. The system shown and described is merely exemplary, and is used to explain the exemplary methods described below and depicted in part in FIGS. 2 and 3. Further, embodiments of the present invention operate on individual, non-networked computing devices wherein installation of software components may comprise transfer from computer memory, or computer readable media to the computing device.

The client computing devices each include a computer-readable medium, for example a random access memory (RAM), coupled to a processor. The processor executes computer-executable program instructions stored in memory 108. Such processors may include a microprocessor, an ASIC, state machines, or other processor, and can be any of a number of computer processors, such as processors from Intel Corporation of Santa Clara, Calif., IBM Corporation of Raleigh, N.C. and Motorola Corporation of Schaumburg, Ill. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor of the client device with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client computing devices can be connected to a network, as shown in FIG. 1B, or can be stand-alone machines, as shown in FIG. 1A. Client computing devices may also include a number of external or internal devices such as a mouse, a CD-ROM, DVD, a keyboard, a display, or other input or output devices. Examples of client computing devices are personal computers, digital assistants, personal digital assistants, cellular phones, mobile phones, smart phones, pagers, digital tablets, laptop computers, Internet appliances, and other processor-based devices. In general, the client computing devices may be any type of suitable processor-based platform that operates on any suitable operating system, such as Microsoft Windows®, PocketPC, Palm, Apple OS, UNIX, JAVA, EPOCH, Linux or the like, capable of supporting one or more client application programs. For example, the client computing device shown comprises a personal computer executing client application programs, also known as client applications. The client applications can be contained in memory and can include, for example, a word processing application, a spreadsheet application, an e-mail application, an instant messenger application, a presentation application, an Internet browser application, a calendar/organizer application, and any other application capable of being executed by a client device.

A user can interact with the various client applications and articles associated with the client applications via various input and output devices of the client computing device. Articles include, for example, word processor, spreadsheet, presentation, e-mail, instant messenger, database, and other client application program content files or groups of files, web pages of various formats, such as HTML, XML, XHTML, Portable Document Format (PDF) files, and audio files, video files, or any other documents or groups of documents or information of any type whatsoever.

The user's interaction with articles, the client applications and the client computing device creates event data that may be observed, recorded, analyzed or otherwise used. An event can be any occurrence possible associated with an article, client application or client device, such as inputting text in an article, sending an article, receiving an article, manipulating an input device, opening an article, saving an article, closing an article, opening a client application program, closing a client application program, idle time, processor load, memory usage, and any other possible interaction with an article or a client application program whatsoever.

For operation of one embodiment of the present invention, the memory of the client device may include a capture processor, a queue, an update processor and a data store. The memory of the client computing device may also contain a search engine application program, also known as a search engine. The search engine can locate relevant information on the client device, the network and/or the World Wide Web and provide a result set.

The capture processor can capture all events and associated client articles associated with the client applications. In an embodiment the capture processor comprises multiple capture components. For example, the capture processor shown comprises a separate capture component for each client application. The capture component for each client application may comprise information relating to the current version of the application, and/or application features, and utilization of features of the application. The capture processor also comprises a separate capture component that monitors overall network activity in order to capture event data associated with network activity, such as data transfer in and out of the client device. The capture processor further comprises a separate capture component that monitors overall client device performance data, such as processor load, disk access, the client applications in use, and the amount of memory available.

In one embodiment, the capture processor through the individual capture components monitors activity on the client device and captures the event by a generalized event registration mechanism, such as an event schema. Each capture component can register its own event schema or can use a predefined one. Event schema can differ depending on the client application or activity the capture component is monitoring. Generally, the event schema can describe an event by providing data associated with the event and any associated article as well as the content of any associated article. For example, an event schema for an email event received by a user can include header information, such as the content from the subject, to, from, cc, and time received fields, and body information. An event schema for a web page currently being viewed by a user can include the Uniform Resource Locator or URL of the web page and the content of the web page. An event schema for a word processing document being saved by a user can include the title of the document, the time saved, the location of the document, the format of the document, the text of the document, and a pointer to the location of the document.

The capture processor can capture events in real time or real time events and can capture events that have occurred in the past or historical events. Real time events can be loading, saving, or viewing an article, such as saving a word processing document, viewing a web page, viewing an email, and saving an MP3 file, and updating the metadata of an article, such as bookmarking a web page, printing a presentation document, deleting a word processing document, and moving a spreadsheet document. Some real time events are contextual and relate to current user state or context. For example, contextual events can be loading, saving or viewing an article, such as saving a word processing document, viewing a web page, viewing an email, and saving an MP3 file, examining a portion of an article, such as selecting a portion of text, moving a mouse over a portion of a web page, and viewing a slideshow, changing an article, such as typing a word in an email or pasting a sentence in a word processing document, and closing a document, such as closing an instant messenger window or changing an email message being viewed.

Historical events are similar to real time events. Examples of historical events include, the user's saved word processing documents, the emails in a user's inbox, and the web pages bookmarked by the user. Historical events can be captured by the capture processor by periodically crawling the memory and any associated data storage device for events not previously captured by the capture processor.

Events captured by the capture processor are sent to a queue in the form of event schema. The capture processor can also send performance data to the queue. The queue holds the events and performance data, for example until the search engine is ready to process an event or the performance data. The queue can comprise three separate queues one for contextual events, one for indexable events, and one for performance data. The queue can be implemented as a circular priority queue using memory mapped files. Other implementations of the queue are possible. The indexable queue can be a two priority queue where higher priority events are served before lower priority events. Generally, real time events are given higher priority than historical events.

The search engine comprises an indexer, a query system, and a formatter. All real time events, contextual and indexable, and performance data can be sent by the queue to the query system to provide the query system with information concerning current user context. In an embodiment of a method of the present invention, client application capture component data relating to the components and usage of features of a client software application may be sent by the queue to an install processor and a query system.

The install processor evaluates the captured component data and makes a determination to install a software component. The install processor generates a request to the query system to locate the software component to be installed.

The query system may use the captured component data and the request to generate an implicit query to computer memory and/or to the publisher of the client application and receive data and files for installation from the publisher of the client application.

In embodiments of the present invention, the search engine may generate an update query to the software publisher on a fixed time interval, for example every 24 hours, every hour, every 15 minutes. A query may also be generated when the capture processor determines a feature of the client application is being opened, and/or when the capture processor determines a feature of the client application has not used for a certain time interval. The install processor also communicates with the search engine and the queue and processes performance data from the capture processor.

Figure 2:
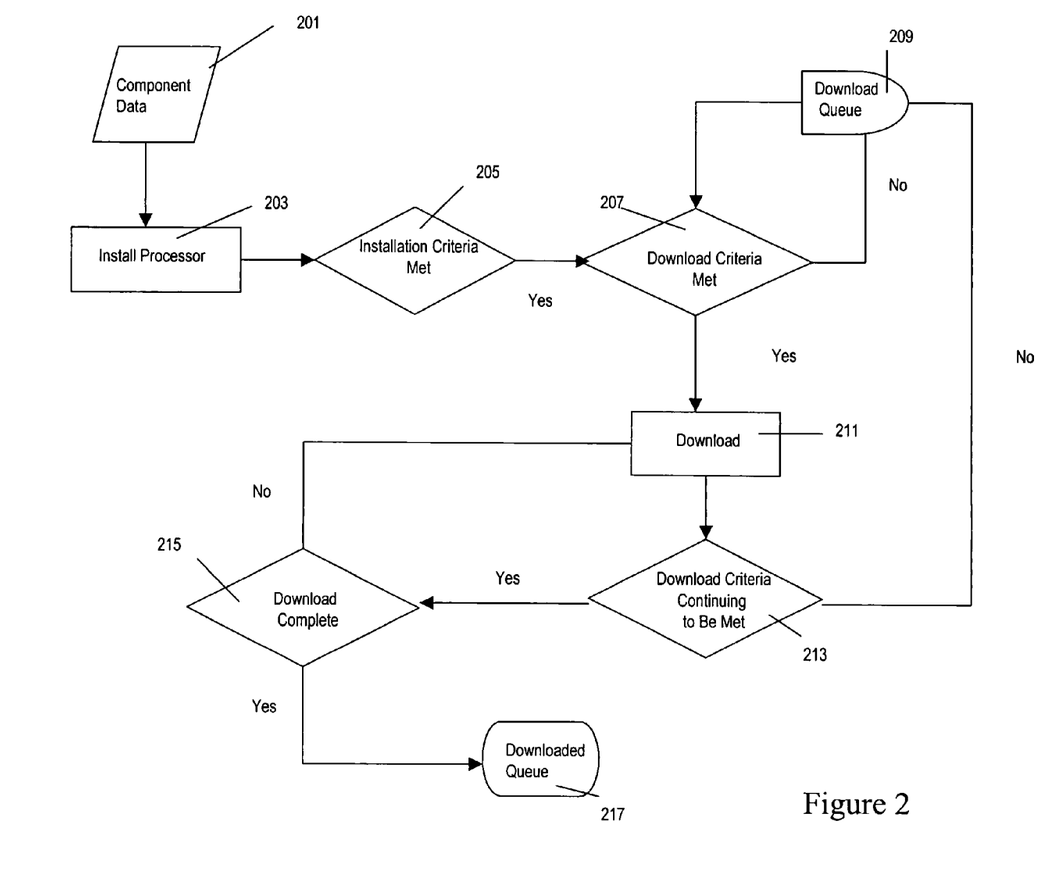
FIG. 2 is a schematic overview of a installation determination process in an embodiment of the present invention.

The installation determination may be managed by the install processor. As shown in FIG. 2, captured component data, 201, is received by an install processor 203. The install processor evaluates whether an installation criterion for a particular software component is met, 205. The installation criterion may comprise one or more of the criteria described above. If an install criterion is not met, the process is resumed at a later time interval. If the installation criteria is met, the install processor next determines whether download criteria, 207, are met to determine whether to initiate a request for downloading a software component. The download criteria may comprise one or more of the following criterion, or combinations thereof: the client application feature to be updated is not being utilized; overall processor usage is below a set threshold; the available bandwidth for downloading is above a set threshold; disk usage is below a threshold; available free memory is above a threshold; and the like. If a download criterion is not met, the download query is queued in a download queue 209. Periodically, the install processor rechecks the performance data to determine whether download criteria have been met. If download criteria are met, the download, 211, is made to a downloaded queue, 217, which is contained in the processor memory or on an associated storage device. The install processor also processes performance data during the download process to ensure that the download criteria continue to be met, 213. If during a download a download criterion fails to be met, for example if the client device needs network bandwidth for other uses, the downloading is halted. The downloaded data already obtained may be stored in the update queue 209. Downloading is resumed when the download criteria are met again. When downloading is complete, 215 the downloaded file may be maintained in a downloaded queue 217 until initiating of an installation process.

A feature of an embodiment of the present invention is that during downloading the update processor may monitor network usage and thereby available bandwidth. The update processor may also limit bandwidth used by the download process. This limiting is referred to herein as throttling. The update processor may throttle the downloading to use lesser amounts of network bandwidth when the performance data indicates another use of bandwidth, and to use greater amounts of network bandwidth when the performance data indicates availability.

Another feature of an embodiment of the present invention is that the install processor can utilized performance data and/or other captured data to determine whether the downloading process may be masked by processing being undertaken by the client device. For example, if the client device is processing streaming media from the Internet and there is available bandwidth, the update processor may use some of the available bandwidth to initiate or complete downloading of an update. If a user is not always connected to the network, this may allow installation when the connection is known to be active.

After downloading is complete, the install processor may initiate an installation process for installing the update. Many software packages will automatically initiate an installation process after downloading. The install processor may initiate installation for packages that do not begin installation themselves. The install processor may monitor performance data during the installation process and begin installation when performance data indicates other client applications will not be adversely impacted. In this regard a set of installation criteria, for example, similar to the download criteria may be utilized. If necessary, the install processor may prompt the user to confirm the install or to allow shutdown of any necessary applications.

Figure 3:
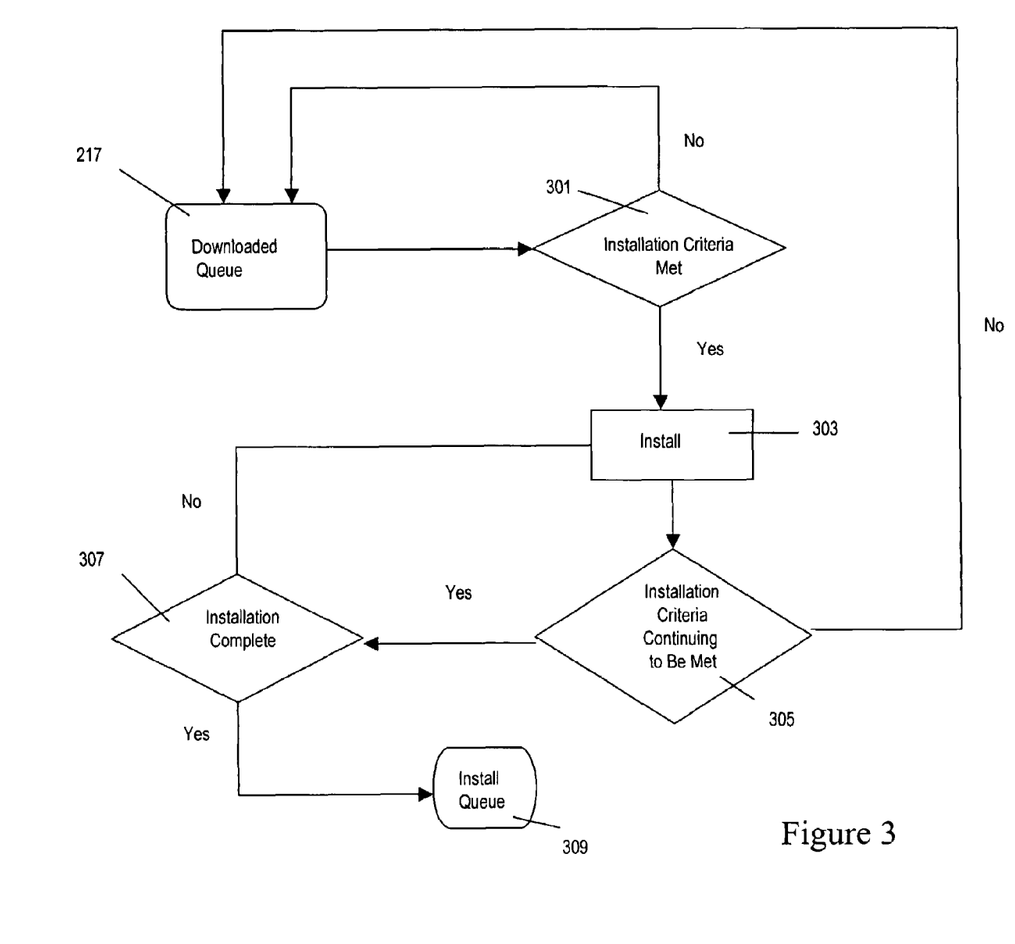
FIG. 3 is a flowchart of an installation process in another embodiment of the present invention.

FIG. 3 provides an overview of an embodiment of an installation process. A complete downloaded software component may be accessed from the downloaded queue 217. Using performance data relating to client device applications, the install processor determines whether a installation criteria 301 have been met. The installation criteria may be similar to the download criteria and may comprise one or more of the following criterion, or combinations thereof: the client application feature to be updated is not being utilized; overall processor usage is below a set threshold; disk usage is below a threshold; available free memory is above a threshold; and the like. If an installation criterion is not met, the downloaded software remains queued in downloaded queue 217. Periodically, the update processor rechecks the performance data to determine whether installation criteria have been met. If installation criteria are met, the installation, 303, is made to processor memory, or an associated storage device, for the client application on the client device. The install processor also processes performance data during the install to ensure that the installation criteria continue to be met, 305. If during a download an installation criterion fails to be met, for example if the client device needs the processor for other uses, the installation is halted. Details relating to the portion already installed, and the remainder of the install may be stored in downloaded queue 217. Installation is resumed when the install criteria are met again. When installation is complete, 307 details relating to the installed file may be maintained in an install queue 309. The capture processor may capture data from queue 309 to determine when additional updates are needed.

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

The invention claimed is:

1. A method for installing a software component on a recipient computing device on a network connected to a donor computing device comprising the software component, the method comprising:

monitoring resource usage by software applications running on the recipient computing device, wherein the monitored resource usage comprises usage of the network by the software applications;

determining a need of the recipient computing device for a software component;

detecting a switch of the recipient computing device from a low-speed network connection to a high-speed network connection;

initiating, responsive to detecting the switch, a transfer of the software component from the donor computing device to the recipient computing device via the network during a time period when the monitored resource usage indicates that sufficient network bandwidth is available to not adversely impact usage of the network by the software applications; and initiating an installation of the software component on the recipient computing device during a time period selected based on the determined need and the monitored resource usage that does not adversely impact the software applications.

2. The method of claim 1, wherein the monitoring the resource usage by the software applications running on the recipient computing device comprises monitoring usage of a processor.

3. The method of claim 1, wherein the monitoring the resource usage by the software applications running on the recipient computing device comprises monitoring usage of a processor by the software applications, and the method further comprises initiating the installation of the software component during a time period when sufficient processor resources are available to not adversely impact usage of the processor by the software applications.

4. The method of claim 1, further comprising:

monitoring the transfer of the software component; and reducing a transfer rate for the transfer of the software component based on an increase in the usage of the network by the software applications.

5. The method of claim 4 wherein the reducing the transfer rate for the transfer of the software component comprises halting the transfer, and wherein the method further comprises:

resuming the transfer based on a decrease in the usage of the network by the software applications; and continuing the transfer until the software component has been transferred to the recipient computing device.

6. The method of claim 4, wherein the reducing the transfer rate for the transfer of the software component comprises adjusting the transfer rate for the transfer of the software component based on a change to a network connection of the recipient computing device.

7. The method of claim 4, wherein the reducing the transfer rate for the transfer of the software component comprises setting a maximum transfer rate for the transfer of the software component to a value that is less than a current rate.

8. The method of claim 1, wherein the determining the need of the recipient computing device for the software component comprises monitoring a usage pattern of a user of the recipient computing device.

9. The method of claim 1, wherein the initiating the installation of the software component on the recipient computing device comprises initiating the installation of the software component on the recipient computing device when sufficient processor resources are available.

10. The method of claim 1, wherein the monitoring the resource usage by the software applications running on the recipient computing device comprises monitoring usage of a storage medium.

11. The method of claim 1, wherein the determining the need of the recipient computing device for the software component comprises surveying files on the recipient computing device.

12. The method of claim 1, wherein the initiating the installation of the software component on the recipient computing device comprises initiating the installation of the software component on the recipient computing device when sufficient space on the storage medium is available.

13. A computer-readable storage medium on which is encoded executable program code for performing a method comprising:
    monitoring resource usage by software applications running on a recipient computing device, wherein the monitored resource usage comprises usage of the network by the software applications;
    determining a need of the recipient computing device for a software component;
    detecting a switch of the recipient computing device from a low-speed network connection to a high-speed network connection;
    initiating, responsive to detecting the switch, a transfer of the software component from a donor computing device to the recipient computing device via the network during a time period when the monitored resource usage indicates that sufficient network bandwidth is available to not adversely impact usage of the network by the software applications; and
    initiating an installation of the software component on the recipient computing device during a time period selected based on the determined need and the monitored resource usage that does not adversely impact the software applications.

14. The computer-readable storage medium of claim 13, wherein the monitoring the resource usage by the software applications running on the recipient computing device comprises monitoring usage of a processor.

15. The computer-readable storage medium of claim 13, wherein the monitoring the resource usage by the software applications running on the recipient computing device comprises monitoring usage of a processor by the software applications, and the method further comprises initiating the installation of the software component during a time period when sufficient processor resources are available to not adversely impact usage of the processor by the software applications.

16. The computer-readable storage medium of claim 13, wherein the method further comprises:
    monitoring the transfer of the software component; and
    reducing a transfer rate for the transfer of the software component based on an increase in the usage of the network by the software applications.

17. The computer-readable storage medium of claim 16, wherein the reducing the transfer rate for the transfer of the software component comprises halting the transfer, and wherein the method further comprises:
    resuming the transfer based on a decrease in the usage of the network by the software applications; and
    continuing the transfer until the software component has been transferred to the recipient computing device.

18. The computer-readable storage medium of claim 16, wherein the reducing the transfer rate for the transfer of the software component comprises adjusting the transfer rate for the transfer of the software component based on a change to a network connection of the recipient computing device.

19. The computer-readable storage medium of claim 16, wherein the reducing the transfer rate for the transfer of the software component comprises setting a maximum transfer rate for the transfer of the software component to a value that is less than a current rate.

20. The computer-readable storage medium of claim 13, wherein the determining the need of the recipient computing device for the software component comprises monitoring a usage pattern of a user of the recipient computing device.

21. The computer-readable storage medium of claim 13, wherein the initiating the installation of the software component on the recipient computing device comprises initiating the installation of the software component on the recipient computing device when sufficient processor resources are available.

22. The computer-readable storage medium of claim 13, wherein the determining the need of the recipient computing device for the software component comprises surveying files on the recipient computing device.

23. A computing device, comprising:
    a computer processor;
    software applications running on the computer processor;
    a capture processor running on the computer processor and configured to (1) monitor resource usage by the software applications, wherein the monitored resource usage comprises usage of the network by the software applications, (2) determine a need of the computing device for a software component, and (3) detect a switch of the computing device from a low-speed network connection to a high-speed network connection; and
    an install processor running on the computer processor and configured to (1) initiate, responsive to detecting the switch, a transfer of the software component from a donor computing device to the computing device via the network during a time period when the monitored resource usage indicates that sufficient network bandwidth is available to not adversely impact usage of the network by the software applications, and (2) initiate an installation of the software component on the computing device at a time selected based on the determined need and the monitored resource usage that does not adversely impact the resource usage by the software applications.

24. The computing device of claim 23, wherein the resource usage monitored by the capture processor comprises usage of the computer processor and usage of a storage medium.

25. The computing device of claim 23, wherein the capture processor is further configured to monitor usage of the computer processor by the software applications, and wherein the installation processor is further configured to initiate the installation of the software component at a time when sufficient computer processor resources are available to not adversely impact usage of the computer processor by the software applications.

* * * * *